March 17, 1959 O. J. MOEHLER 2,877,806

FILAMENT MOUNTING DEVICE

Filed March 8, 1956 8 Sheets-Sheet 1

INVENTOR.
OTTO J. MOEHLER.
BY [signature]
ATTORNEY.

INVENTOR.
OTTO J. MOEHLER

BY [signature]

ATTORNEY.

March 17, 1959 O. J. MOEHLER 2,877,806

FILAMENT MOUNTING DEVICE

Filed March 8, 1956 8 Sheets-Sheet 3

INVENTOR.
OTTO J. MOEHLER
BY [signature]
ATTORNEY.

March 17, 1959 O. J. MOEHLER 2,877,806

FILAMENT MOUNTING DEVICE

Filed March 8, 1956 8 Sheets-Sheet 4

INVENTOR.
OTTO J. MOEHLER.
BY [signature]
ATTORNEY

FILAMENT MOUNTING DEVICE

Filed March 8, 1956

8 Sheets-Sheet 5

INVENTOR.
OTTO J. MOEHLER
BY
ATTORNEY.

FILAMENT MOUNTING DEVICE

INVENTOR.
OTTO J. MOEHLER
BY [signature]
ATTORNEY.

March 17, 1959 O. J. MOEHLER 2,877,806

FILAMENT MOUNTING DEVICE

Filed March 8, 1956 8 Sheets-Sheet 7

INVENTOR.
OTTO J. MOEHLER

BY [signature]
ATTORNEY.

March 17, 1959 O. J. MOEHLER 2,877,806
FILAMENT MOUNTING DEVICE
Filed March 8, 1956 8 Sheets-Sheet 8

INVENTOR.
OTTO J. MOEHLER.
BY
Wm. F. Kelly
ATTORNEY.

2,877,806

FILAMENT MOUNTING DEVICE

Otto J. Moehler, Newark, N. J., assignor to Westinghouse Electric Corporation, East Pittsburgh, Pa., a corporation of Pennsylvania Application March 8, 1956, Serial No. 570,263

6 Claims. (Cl. 140—71.6)

This invention relates to machines for mounting filaments and, more particularly, to a device for feeding and mounting short-length filaments in photoflash lamps.

An object of the invention is to provide a device which automatically grips and presents filament wire from a roll to successive machine-fed stems.

Another object of the invention is to assure accuracy of placement of the filament.

A further object of the invention is to minimize length of stroke or movement of movable parts of the filament mounting device to adapt the device to high speed lamp manufacture.

Yet another object is to provide a filament mounting device having a rotating turret for withdrawing the filament wire from its spool and feeding it to the location where it is cut and mounted on a lamp stem.

Still further objects of the invention will appear to persons skilled in the art to which it appertains as the description proceeds, both by direct recitation thereof and by inference from the context.

Referring to the accompanying drawings, in which like numerals of reference indicate similar parts throughout the several views.

Figure 1:
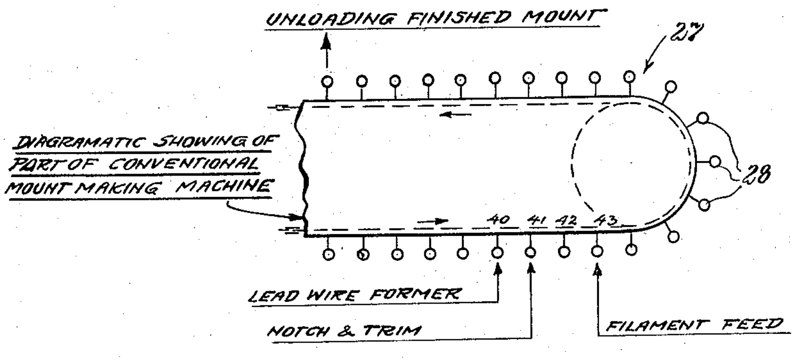
Fig. 1 is a fragmentary diagrammatic plan view of the general organization of a portion of a conventional automatic conveyor type mount making machine with which the filament mounting device of the present invention may be utilized at a location therein, designated as station "43."

The present invention is directed particularly to a filament mounting device for a machine for manufacturing photoflash lamp stem mounts by operations at successive stations, said device functioning at one such station, for example station "43." The general organization of the machine and the relation thereto of said filament mounting device is indicated diagrammatically in Fig. 1. While a conveyor type machine is indicated and preferred, it will be understood that the invention may be employed with rotary machines if desired. A filament 25 is applied by the filament mounting device of this invention to a stem 26, shown in Fig. 21. For purposes of effecting successive fabrication of filaments 25 and stems 26 to constitute complete assemblies or mounts, the conveyor 27 (Fig. 1) of the machine has a continuous series of heads or stem holders 28 (Figs. 2 and 4) for presenting stems 26, one after the other, to said filament mounting device. The conveyor 27 is driven with an intermittent or indexing motion so that as each head 28 arrives at a definite position relative to the filament mounting device, the conveyor 27 pauses with a stem holder 28 opposite each station. One such holder 28 is shown at its position of pause or work at the filament mounting device of this invention in Figures 2 and 4, together with the stem 26 carried by said holder 28.

*General operation*

Figure 15:
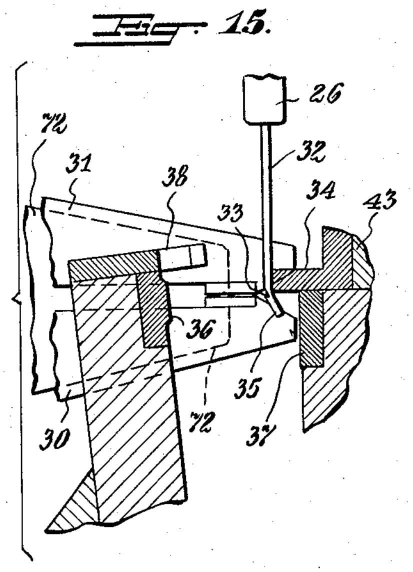
Figure 16:
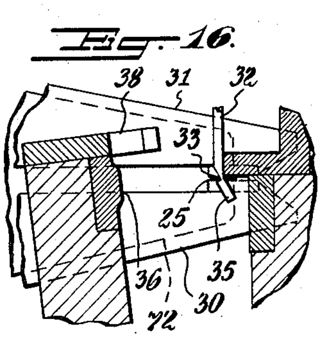

In its general aspects, the filament mounting device of this invention provides a turret 29 (Figs. 2, 3 and 4) with filament-wire gripping jaws 30, 31 (Figs. 11, 14–20) which hold the filament wire taut at the section thereof being presented for attachment to the lead wires or posts 32 (Fig. 21) of the stem 26. The turret 29 is both rotatable and transitionally movable transverse to a pair of lead wires 32 so as to adavnce the filament wire crosswise of (and into tensional engagement with) said lead wires 32. At a previous station, identified in Fig. 1 as station "41" the lead wires 32 are notched, as at 33 (Figs. 4, 14–20 and 21) at the level of the mounting of the filament 25, so that when the stem 26 arrives at station "43" the notches 33 will be toward the filament 25 which is then laterally advanced to enter said notches 33 by the transitional movement of the turret 29. As shown in Fig. 16, the filament 25 will be tensionally seated in said notches.

The filament mounting device further provides a brace 34 (see Figs. 4 and 14–20), which moves inward toward the lead wires 32 on the opposite sides thereof from said notches 33 and just above the level of the notches 33 so that said lead wires 32 will remain vertical and not be deflected by the pressure applied by the tensioning of the filament 25 in the notches 33. Formation of the notches 33 is accomplished by a chisel (not shown) that creates a notch 33 without removal of metal and in doing so bends the tip or terminal end 35 of the lead wire 32 angularly away from the notch 33 (Fig. 4) thus affording a clear path for entry of the filament 25.

Figure 18:
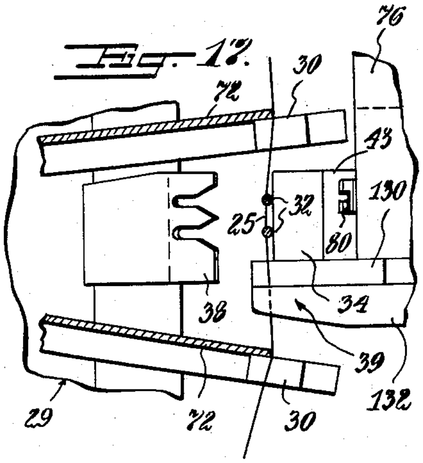
Figure 19:
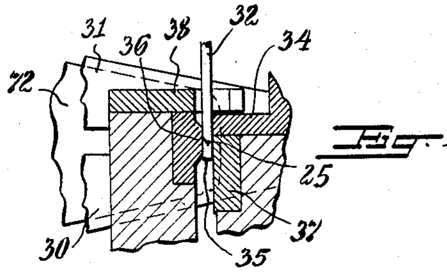
Figure 20:
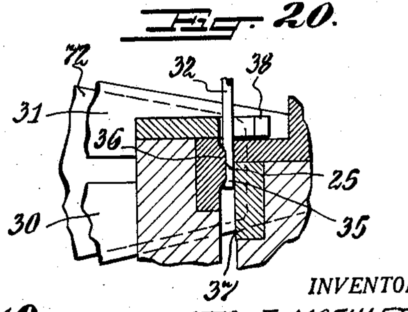

The filament mounting device further provides means for bending this tip or terminal end 35 back into alignment with the rest of the lead wire 32 (after the filament 25 is located in the notches). The notch 33 is thereby closed and grips the filament 25 within the same. This means mentioned includes a hammer 36 (Figs. 4, and 14–20) which is brought into juxtaposition to the notches 33 and a straightener or anvil 37 opposed to the hammer 36 to engage the bent-out back side or tip 35 of the lead wire 32 and bend the tip 35 into vertical engagement in cooperation with said hammer 36 thereby squeezing the notch 33 closed to permanently grip the filament 25 (Fig. 19). Thereafter the hammer 36 continues its motion to solidly embed the filament 26 in the notch 33 (Fig. 20). In conjunction with the hammer 36 there is provided a lead wire retainer and filament length gauge 38 above the hammer 36 (Fig. 4) which engages the lead wires 32 and prevents them from lateral displacement toward or away from each other.

The filament mounting device furthermore provides a cutter 39 (Figs. 2, 3 and 17) which is arranged to sever the filament wire from its supply end between one pair of the turret jaws 30—31 and the lead wires 32 nearest thereto.

Figure 4:
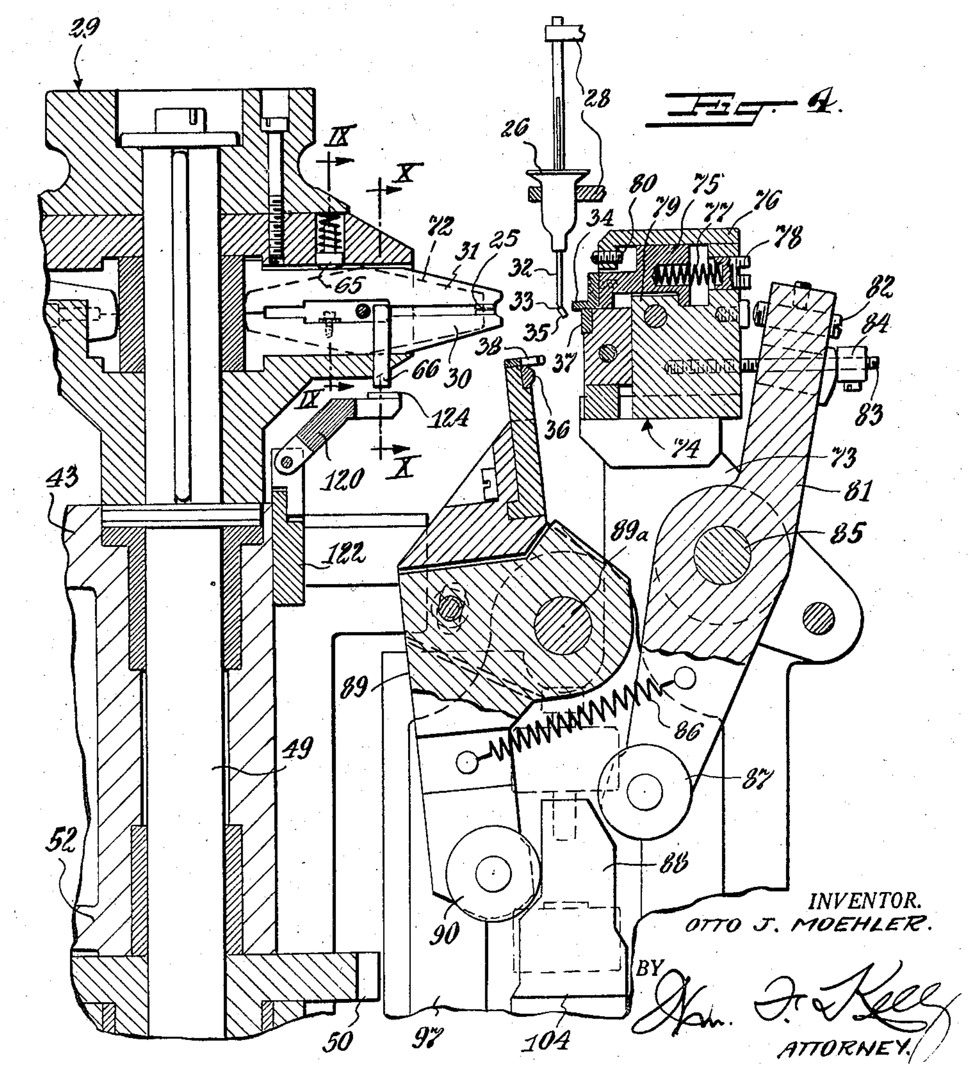
Fig. 4 is a vertical sectional view along the line IV—IV of Fig. 3 in the direction of the arrows.
Figure 17:
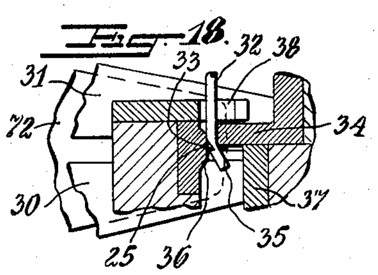

Fig. 4 shows the position of the stem 26 after the head 28 has indexed into station "43," the filament feeding station, in front of the filament mounting device of the invention. The filament wire gripping jaws 30—31 on the turret 29 then move transitionally transverse to the lead wires 32 from the dotted position shown in Fig. 14 to the filament loading position shown in Figs. 16–20. The solid line position of the jaws 30, 31 shown in Fig. 14 indicate the jaw position when the hammer 36 starts to move upwardly and the brace 34 and anvil 37 start to move together laterally toward the lead wires 32. Fig. 15 shows the hammer 36 in its uppermost vertical position (ready to rotate inwardly toward lead wires 32) and the brace 34 in its innermost position against the lead wires 32 to brace and to align said wires 32 with respect to the filament wires. The jaws 30, 31 continue their continuous motion to place the filament wire in the notches 33 in the braced lead wires 32 as shown in Figs. 16–17. As shown in Fig. 17, wire locating blades 72 carried by the jaws 30, 31 carry the outer ends of the filament wire past the vertical plane of the lead wires 32 to insure the seating of the filament 25 in the notches 33. Now the hammer 36 and the lead wire retainer and filament length gauge 38 rotate inwardly toward the filament 25 in the notches 33 (Fig. 18). It will be understood that the retainer 38 engages the lead wires 32 to align said wires 32 and thus guarantee a uniform length of the filament 25 before hammer 36 engages the lead wires 32. As shown in Fig. 19 the anvil 37 which in this instance acts as a hammer now moves laterally (to the left) with respect to the now stationary brace 34 and hammer 36 (which in this instance acts as an anvil) to straighten out the tips 35 of the lead wires 32 to lock the filament 25 in the notches 33. To insure solid embedding (and good resultant electrical contact therebetween) of the filament 25 in the lead wires 32 the hammer 36, acting as a hammer, rotates a slight distance clockwise as shown in Fig. 20. During this movement of the hammer 36 the anvil 37 remains stationary. The ends of the filament 25 are cut by the cutter 39 (Figs. 2, 3, and 17) to complete the mount. The hammer 36, brace 34 and anvil 37 retract to the position shown in Fig. 4, and the head 28 carrying the completed mount indexes to next station.

*Filament mounting device*

The filament mounting device as herein shown, provides an inverted U-shaped frame casting 40 (Figs. 2, 3, 5, 6, 8, 12) fixed at station "43" to an angle or mounting bracket 40*a* carried on the side of the general machine frame 41. A slidable carriage 43 (Figs. 2 and 3) is carried at a top part of this frame casting or turret mounting casting 40, in appropriate ways 42 (the longitudinal direction of which is toward the machine frame 41).

*Turret or carriage sliding or reciprocating mechanism*

Sliding of the carriage 43 is effected by a bell crank lever 44 (Figs. 2, 5, 7, and 8) pivoted to the frame casting 40 and having its upper arm in operative engagement with the carriage 43 and its lower arm depending below said frame casting 40 and connected by an adjustable link 45 (Fig. 5) to a cam shoe 46 having riding contact with a constantly rotating carriage reciprocating cam 47 on a driven main cam shaft 48 synchronized with the indexing drive (not shown) for the conveyor 27.

*General turret operation*

The aforementioned turret 29 includes a depending axle or spindle 49 (Figs. 3, 4, and 7) fast therewith reciprocable in a clearance slot in the top plate of the frame casting 40 and standing uprightly from and appropriately journalled to rotate in said carriage 43. The turret 29 and spindle 49 are carried forwardly and rearwardly by the sliding of the carriage 43, and during the interval that they are in rearward or retracted position, the spindle 49 and turret 29 are rotatively indexed to a new position at which they remain while the carriage 43, spindle 49 and turret 29 are moved to forward position and again back to the rearward or retracted position.

*Turret indexing mechanism*

This step-by-step rotation of the turret 29 is effected by a ratchet wheel 50 (Figs. 4, 6, 7, 11 and 12) fixed on a lower part of said spindle 49. A spring-loaded holding pawl 51 (Figs. 7 and 12) is swiveled on an appropriate part of the carriage 43, for instance, upon a lateral jetty or projection 52 (Fig. 4) from the journal housing of the shaft 49. A spring-loaded advancing pawl 53 (Figs. 7 and 12) is at the opposite side of the ratchet wheel 50 from said holding pawl 51 and is swiveled on the upper side of a rocker 54 which is mounted to oscillate upon the lower end portion of the turret sprindle 49 immediately below and parallel to the ratchet wheel 50.

Oscillation of rocker 54 is obtained by a slider 55 (Figs. 7 and 12) located below said rocker 54 and movable in a direction transverse to the path of movement of the carriage 43. Said slider 55 has a pair of upstanding curbs or rocker pin guide faces 56, the work faces whereof are toward and parallel to each other and transverse to the direction of sliding of said slider 55 and in planes parallel to the direction of movement of the carriage 43. A roller pin 57 (Figs. 7 and 12) is rotatively carried at the underside of said rocker 54 and depends therefrom into the channel space between said curbs 56.

Therefore, as the carriage 43 moves forwardly and rearwardly, the roller pin 57 moves a like distance between said curbs 56 without requiring or causing any movement of said curbs 56 or of the slider 55 from which said curbs 56 project. However, by sliding the slider 55, said curbs 56 function to swing the rocker 54 through the agency of engagement of said roller pin 57 between said curbs 56. A compression spring 58 (Figs. 7 and 12) exerts continuous pressure at one end of the slider 55 tending to move said slider 55 in its sliding direction. This sliding motion actuate the advancing pawl 53 forwardly to rotate the ratchet wheel 50.

Figures 5, 6, 21:
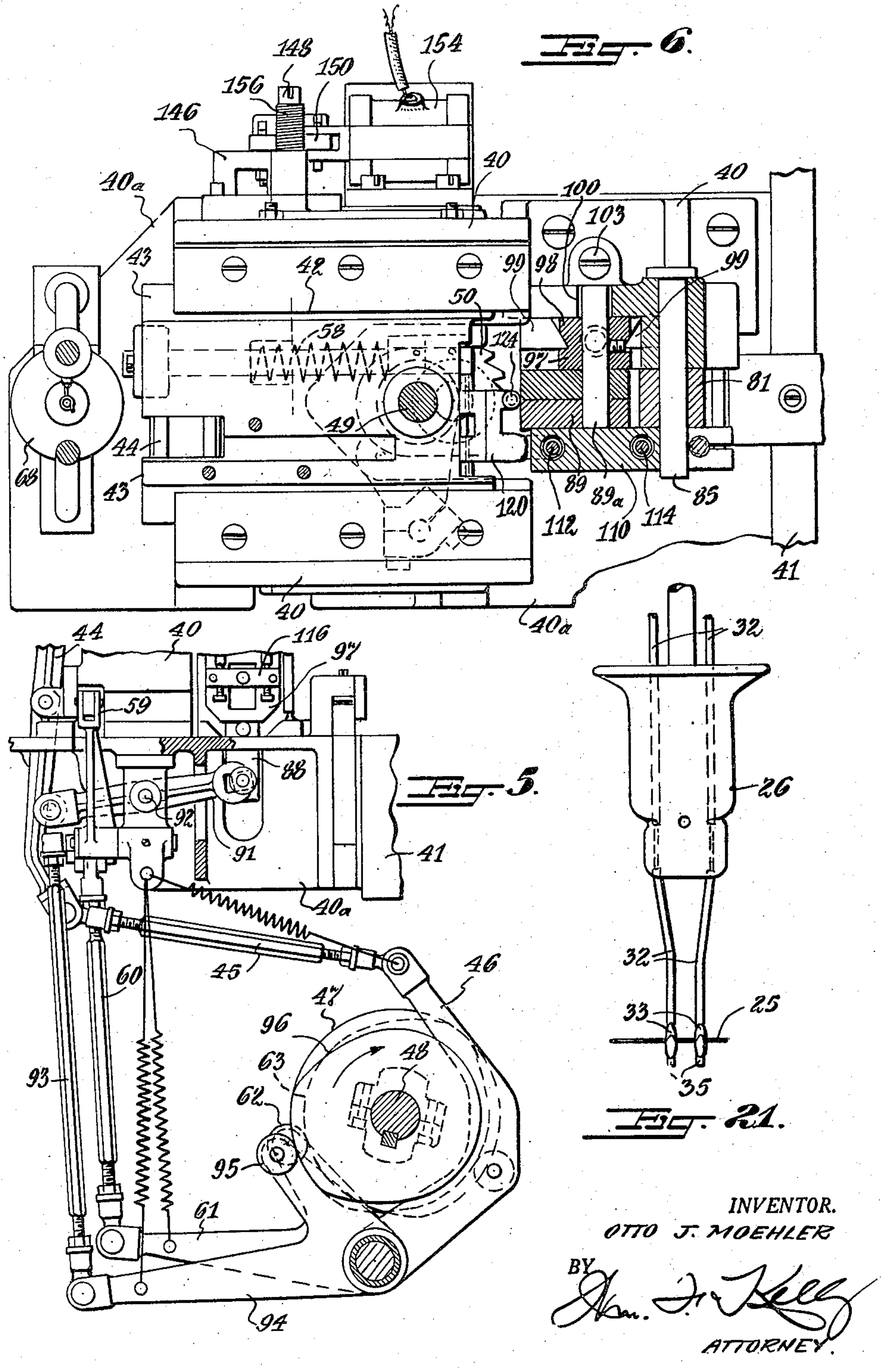
Fig. 5 is a side elevational view (looking in the same direction as in Fig. 3) and showing the driving mechanisms which in most part are below the portion of the unit shown in Fig. 2.
Fig. 6 is a horizontal sectional view along the line VI—VI of Fig. 2 in the direction of the arrows.
Fig. 21 is an elevational view of the completed stem assembly.

The slider 55 is limited in this forward spring-loaded direction of movement by a slider reciprocating mechanism having a lever 59 (Figs. 2, 5 and 12) projecting in front of the forward end of the slider 55. Said lever 59 is connected by an adjustable link 60 to another lever 61, a roller 62 of which rides on a slider reciprocating cam 63 on cam shaft 48 (Fig. 5). This limiting mechanism or slider reciprocating mechanism serves not only to limit forward movement of the slider 55 but also to provide for rearward retraction of the slider 55 against pressure of the spring 58. During this retracting movement of the slider 55 against pressure of the spring 58, the indexing rocker 54 is swung back with the advancing pawl 53, idling over the ratchet 50 ready to function again under impetus of said spring 58.

*Turret*

The turret 29 (Figs. 2, 3 and 4) has a circular series of evenly spaced radially projecting pairs of filament wire gripping jaws 30—31, identified above, and of which one jaw 30 is fixed in the turret and occupies a position below the other jaw 31 which is mounted to swing up and down.

Figures 7, 8, 9, 10:
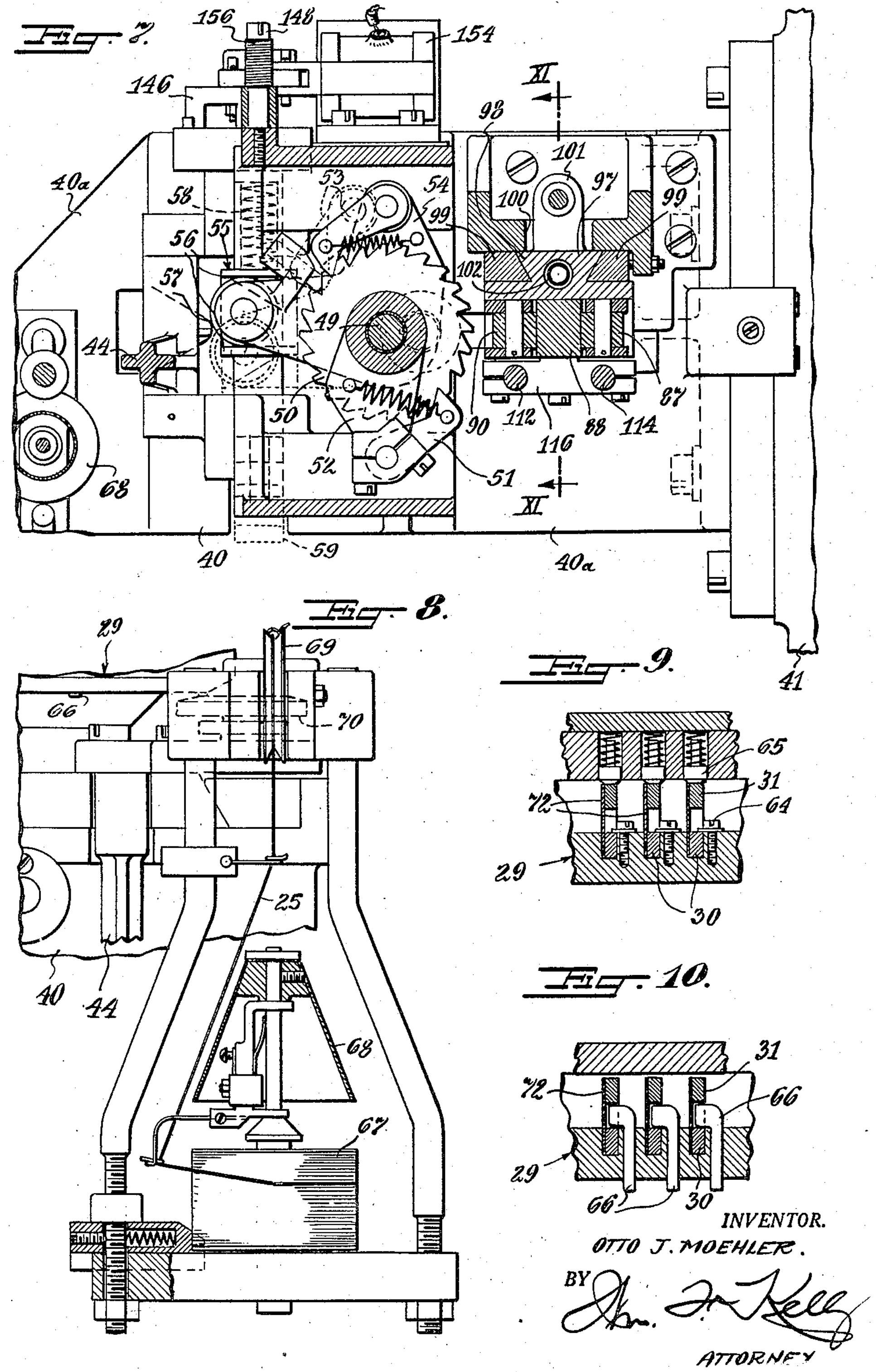
Fig. 7 is another horizontal sectional view along the line VII—VII of Fig. 2 in the direction of the arrows.
Fig. 8 is a vertical sectional view along the line VIII—VIII of Fig. 2 in the direction of the arrows.
Figs. 9 and 10 are vertical sectional views of the turret transverse to the gripping jaws and substantially on lines IX—IX and X—X of Fig. 4 respectively, showing the spring loading applied to the upper jaw as well as the fixed retention of the lower jaw and also showing the lifting pins for operating the upper jaw contra to the spring loading.

As shown in Fig. 9, the lower fixed jaw 30 is held seated in a radial slot of the turret 29 by a screw 64. The upper or swinging jaw 31 is engaged at its upper edge by a spring loaded pin 65 which tends to depress said upper jaw 31 into gripping contact with the fixed jaw 30. It is between these pairs of jaws 30—31 that the filament 25 is gripped. The upper jaw 31 may be lifted, contra to the spring loading, by a vertically disposed push pin 66 (Fig. 10) the lower end of which depends below the turret 29 and the upper end of which has a cane head projection underlying the jaw 31. It will be understood that there is a spring loaded pin 65 and push pin 66 for each pair of jaws 30—31.

The filament wire is fed from a spool 67 (Figs. 2 and 8) reciprocably supported at the outer side of the filament mounting device and in connection with which is provided a suitable unreeling mechanism 68 (Figs. 2, 3, 6, 7, and 8). The unreeled wire passes over a guiding pulley 69 (Figs. 2 and 3) which directs it approximately tangentially to the turret 29 between two pairs of jaws 30—31 that are substantially 90° in advance of the position where the turret 29 is to apply the filament 25 to the lead wires 32. To permit entry of the filament wire between these jaws 30—31 a suitable jaw opening means is provided to lift the push pins 66 of the jaws 31 located thereat.

*Jaw lifting or opening means*

Figure 2:
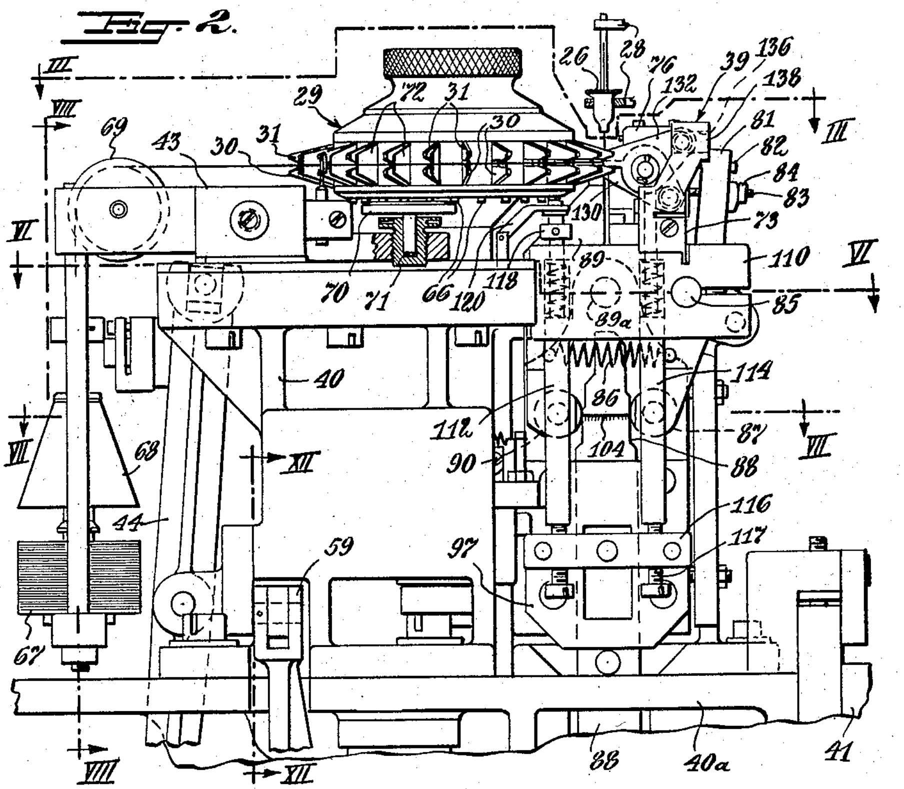
Fig. 2 is a side elevational view (as viewed from the right-hand end of the machine of Fig. 1) of the filament mounting device constituting the subject matter of the present invention.
Figure 3:
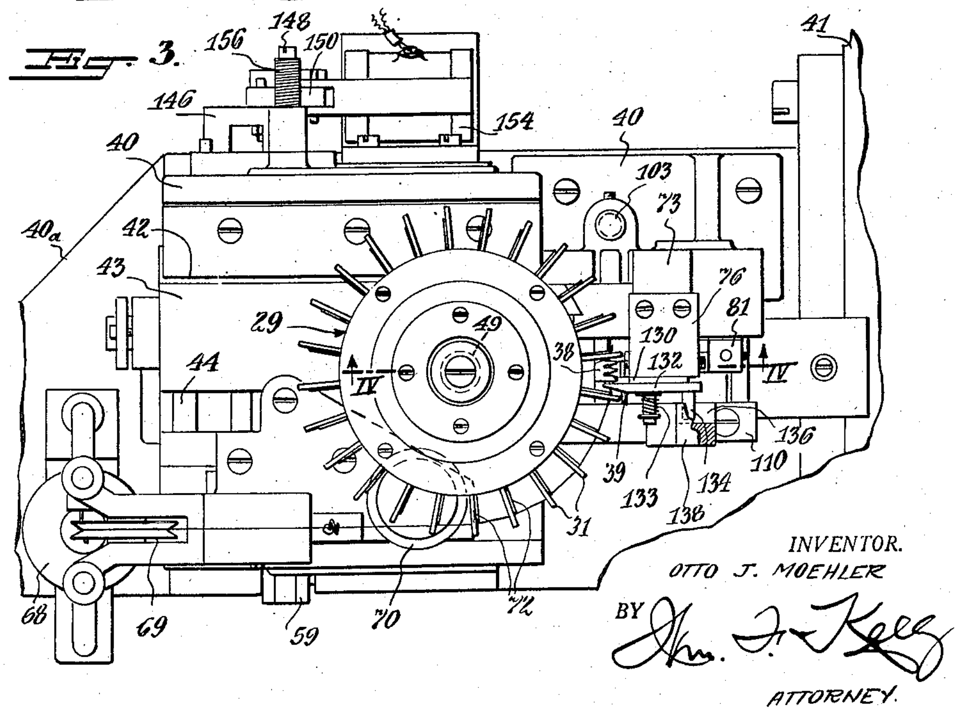
Fig. 3 is a horizontal plan view along the line III—III of Fig. 2 in the direction of the arrows.
Figure 11:
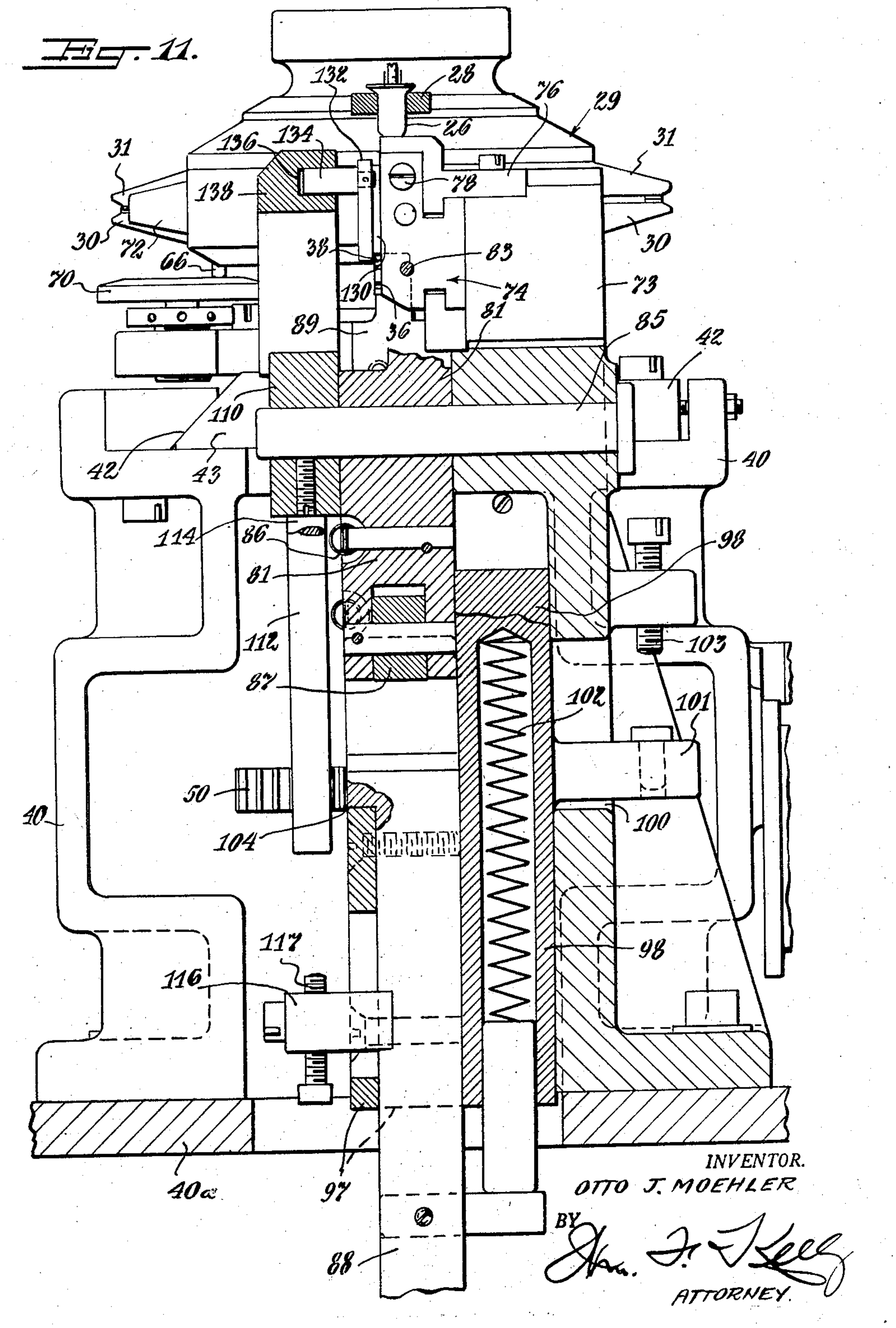
Fig. 11 is a vertical sectional view along the line XI—XI of Fig. 7 in the direction of the arrows, and showing the apparatus in the lowermost inoperative position as shown in Fig. 4.

The specific jaw opening means preferred and shown in Figs. 2, 3 and 11 comprises a horizontally disposed disc 70 with a beveled rim functioning as a rotatable jaw opening cam, the push pins 66 passing up the bevel and approximately chordally across the top of the disc 70. The disc 70 is rotatable on its own axis thereby minimizing the sliding of the ends of the push pins 66 on the disc 70 and consequently avoiding objectionable friction and wear. The disc 70 has a central depending stem terminating at its bottom with a ball end engaging the bottom wall of a socket 71 (Fig. 2) within which the stem is rotatably supported. The socket 71 is externally screw threaded for vertical adjustment in the carriage 43.

When a push pin 66 rides off the disc 70, the jaws 30—31 close due to the spring loading thereof and the filament wire is gripped (and continues to be gripped) as the turret 29 revolves that particular pair of jaws 30—31 in successive steps through a quarter or 90° turn of the turret 29. As the same condition prevails for subsequent pairs of jaws 30—31 in the same quadrant of the turret 29 there are several jaws 30—31 always gripping the filament wire and consequently a very firm hold is had upon the filament wire and no slippage will occur.

At the end of the return stroke of the carriage 43 the turret 29 indexes or rotates, thereby unreeling the filament wire from the spool 67 and placing the filament wire between the next pair of jaws 30—31. It will be understood that there is never any slack wire (i. e. the wire is kept taut even before it is placed between the next pair of jaws so that it is always under control even before it is grasped by the jaws).

*Filament wire location*

Accurate location of the filament wire from the front ends of the jaws 30—31 is required, and in order that it may be so assured, the locating blade 72 (Figs. 3, 4, 14–20) is positioned next to each pair of jaws 30—31, overlapping both jaws of the pair and providing an upright forward edge against which the filament 25 will engage, by virtue of the pull on the wire entering the turret quadrant of rotation. Said forward edges of all of the locating blades 72 are at equal radial distances from the center axis of the turret 29.

By the structure thus described, each time the carriage 43 moves to its forward position it carries a precisely located taut portion of the filament wire to the notched lead wires 32 crosswise thereof and places the wire in the notch 33 of said lead wires 32 bowing the wire slightly to assure a taut condition thereof and certainty of engagement and retention of the wire at the bottoms of the notches 33, even though the wire is taut before and after it is placed in the jaws 30—31.

As heretofore indicated in general terms, a brace 34 is provided to prevent the lead wires 32 from being bent backward under pressure of the introduction of the filament wire. Said brace 34 has to be moved up to the lead wires 32 after the machine has indexed the stem 26 to station "43" where the filament mounting device of this invention is located.

*Brace mounting assembly*

The structure involved is best shown in Figs. 4 and 11 supplemented by the showing in Figures 2 and 3. A fixed stanchion on a tool mounting casting 73 which may be an integral part of the frame casting 40 or a separable casting rises from the bracket **40*a* to a position opposite the level of the filament wire, but low enough for the stem holder or head 28 to pass thereover and far enough from the path of travel of the indexing stems 26 to avoid interfering contact therewith. The upper end portion of said stanchion 73 is constituted as a guideway for a compound slide-block 74, whose direction of sliding is toward and away from the turret 29, and location of which is on the opposite side of the path of movement of the indexing of the stems 26 from said turret 29. Said slide block 74 in conjunction with the stanchion 73 provides a further guideway for a yieldable mounting 75 (Fig. 4) held slidably therein by an overlying cap 76. Spring loading 77 between the rear end of the yieldable mounting 75 and a part of said slide block 74 keeps the yieldable mounting 75 normally at a forward position with respect to said slide block 74. An adjusting screw 78 is shown in the slide block 74 for the spring 77** to bear against and to adjust the tensions.

Aforementioned brace 34 is provided at the forward end of said yieldable mounting 75 and protrudes (in the normal position of the yieldable mounting 75) beyond the forward face of slide block 74. An upward protrusion 79 from the slide block 74 (Fig. 4) into the under face of the yieldable mounting 75 appropriately cut out for the purpose, affords stop means to limit sliding of the yieldable mounting 75 both forwardly and rearwardly with respect to the slide block 74. By the means so far described, the brace 34 normally projects at the forward face of the slide block 74 and in front of the anvil 37 embedded in said slide block face.

Slide block 74 also has a forward movement to bring the anvil 37 into juxtaposition to the lead wires 32 of the stem 26. By virtue of spring loading 77 (Fig. 4)

yieldable mounting 75 moves forwardly into engagement with an adjustable stop, such as screw 80 (Fig. 4) carried by cap 76. This stop 80 is properly adjusted so that the yieldable mounting 75 advances brace 34 into engagement with the lead wires 32 of the stem 26.

Notwithstanding halting of movement of the yieldable mounting 75, the slide block 74 continues its forward movement (to the left when viewed in Fig. 4) until stopped by the vertically sliding or lifting cam 88. The distance of that permitted movement is arranged to bring the front face of the anvil 37 in the same plane with the front edge of said brace 34 as shown in Figs. 18 and 19.

*Brace assembly reciprocating mechanism*

Motivation of said slide block 74 is obtained by a bell crank lever 81 (Figs. 2 and 4) at the rear thereof. The lever 81 functions to motivate the slide block 74 both forwardly and rearwardly at the proper cyclic timing with respect to the filament mounting machine indexing and operation.

As shown, said lever 81 has an adjustable screw 82 for engagement against the rear of the slide block 74 to move the block 74 forwardly the exact amount required, by the amplitude of the swing of the lever 81 (Fig. 4). Retraction of the slide block 74 is obtained by a pull rod 83 fixed in (and protruding from) the rear of the slide block 74 and passing through the lever 81. There is an adjustable dog 84 (Fig. 4) on said pull rod 83 at the outer side of the lever 81 so that as the lever 81 swings outwardly it pulls said pull rod 83 and slide block 74 rearwardly. The lever 81 is fulcrumed at 85 intermediate of its ends to stanchion 73, and therebelow has spring loading 86 by which the upper end of said lever 81 and the slide block 74 are normally moved rearwardly to the retracted position. Said lower end of the lever 81 has a roller 87 engageable by the vertically sliding cam 88 (Fig. 4) to swing the lever 81 contra to the spring loading 86 and thereby obtain forward motivation of the slide block 74.

Preferably the forward motivation of the slide block 74 and actuation of hammer 36 toward the same are effected simultaneously, and in furtherance of this feature the same sliding cam 88 is used for both.

Said hammer 36 is shown carried at the upper end of a bell crank lever 89 (Figs. 2, 3, 4, 5, 6 and 8) pivoted intermediate of its ends on a horizontal lever shaft 89a projecting from a slide carrier 97 (as hereinafter explained), the lower end having a roller 90 (Fig. 4) for engagement with said sliding cam 88 and being spring loaded for that purpose. The present showing utilizes the same spring 86 by which the block-motivating lever 81 is loaded.

*Sliding cam*

Said sliding cam 88 has distinct cam surfaces for the operation of each lever 81 and 89. These surfaces (Fig. 4) are shown as opposite vertical edges of said cam 88. This cam 88 is in the form of a bar, is generally rectangular in cross section, and, as may be seen in Fig. 5 projects below the top plate of the mounting bracket 40a for actuation purposes. As shown in Fig. 5 the sliding cam reciprocating mechanism has said bar 88 slidable in the carrier 97. This bar 88 is appropriately engaged by a lever 91 pivoted at 92 (on a shaft extending between lugs depending from mounting bracket 40a) intermediate of its ends and connected at its far end by a link 93 (Fig. 5) to one arm of a bell-crank lever 94, the other arm of which has a roller 95 thereon engaging a rotary cam 96 on aforementioned cam shaft 48.

*Sliding cam carrier mechanism*

Said sliding cam 88 is slidably mounted on the carrier 97 (Figs. 4, 5, 6, 7, and 11) which also is vertically slidable but with less range of movement than said slide cam 88. Slidable support for the carrier 97 is obtained by a dove-tail spine or lengthwise ridge or fin 98 (Figs. 6, 7 and 11) at what may be called the rear of said carrier 97. The spine 98 is held by ways 99 (at the beveled margins thereof) which are provided in the fixed frame casting 40. A vertical slot 100 is provided in said frame casting 40 back of said spine 98 and a lug 101 (Figs. 7 and 11) on the carrier 97 projects therethrough.

It will be understood from a consideration of Figs. 7 and 11 that the sliding cam 88 and the carriage 97 are held together by a spring 102 (Fig. 11) so that the sliding cam reciprocating mechanism moves both the sliding cam 88 and the carrier 97 upwardly together as a unit, until the lug 101 on the carrier 97 engages an adjustable stop 103 (Fig. 11) projecting from the frame casting 40. For the remainder of the stroke the sliding cam 88 moves with respect to the frame casting 40 and the now stationary carriage 97.

On the "down" stroke of the sliding cam reciprocating mechanism, a shoulder 104 (Fig. 2) provided near the top of the sliding cam 88 engages the carrier 97 pulling the carrier 97 downwardly therewith.

*Jaw opening mechanism*

The tool mounting casting 73 on the mounting bracket 40a carries a generally horizontal top operating rod mounting plate 110 (Figs. 2, 3, 6 and 11) in which are suitably journalled a spring biased jaw opening mechanism operating rod 112 and a spring biased filament cutting mechanism operating rod 114. Both operating rods 112 and 114 are adjustably engageable by a contact plate 116 (Figs. 2, 5, 7 and 11) carried by the sliding cam 88. It will be understood that the contact plate 116 is provided with adjustment screws 117 (Figs. 2 and 11) for adjusting the contact points between the operating rods 112 and 114 and the contact plate 116.

The upper portion of the filament jaw opening mechanism operating rod 112 carries a retaining collar or top 118 (Fig. 2) on its upper end. This upper end of the rod 112 engages a generally angular elongated jaw opening plate 120 (Fig. 4) pivoted on a suitable bracket 122 upstanding from the frame casting 40. This plate 120 extends substantially from a station on the turret 29, 1 or 2 indexes away from the filament mounting position (shown in Fig. 3) to a station substantially 1 or 2 index positions beyond the filament mounting position. This plate 120 carries a jaw opening push-pin engaging button 124, directly beneath the push pin 66 of the jaw 31 to be opened.

When the contact plate 116 on the sliding cam 88 engages the jaw opening operating rod 112, both the rod 112 and the cam 88 move upwardly together. The upper end of the operating rod 112 engages the jaw opening plate 120 which swings in a counterclockwise and upward direction (Figs. 1 and 4) so that the cam 124 thereon engages the push-pin 66, pushing upwardly thereon to open the jaws 30 and 31.

Simultaneously, with the opening of the jaws 30—31 of filament cutting mechanism is operated through means of the spring biased operating rod 114 and the contact bar 116 on the sliding cam 88.

*Filament cutting mechanism*

The hereinbefore mentioned filament wire cutter 39 (Figs. 2, 3, 11 and 17) comprises a lower stationary cutting jaw 130 carried by the tool mounting casting 73 and the movable upper jaw 132 pivotable on the casting 73 and torsioned thereon by a torsion spring 133 (Fig. 3). This movable upper jaw 132 is provided with a horizontal operating pin 134 which is engaged in a generally horizontal slot 136 (Figs. 2 and 3) in a combination yoke and guide 138 carried on the upper end of the operating rod 114. The guide 138 (Fig. 11) may be suitably machined to reciprocate vertically on the upper surface of the mounting plate 110. Thus, it will be seen from a consideration of Figs. 2 and 3, that the contact plate 116 on the sliding cam 88 moves the wire cutting mechanism operating rod 114 upwardly simultaneously with the jaw opening operating rod 112 so that the combination yoke and guide 136 pivots the upper movable cutting jaw 132 in a counterclockwise (Fig. 2) direction to cut the filament wire and separate the now mounted filament 25 from the filament wire held in the still closed jaws 30—31 of the turret 29 which next indexes into the filament mounting station, station "43" while opening the preceding jaws 30—31.

*Stem detector*

Figures 12, 13:
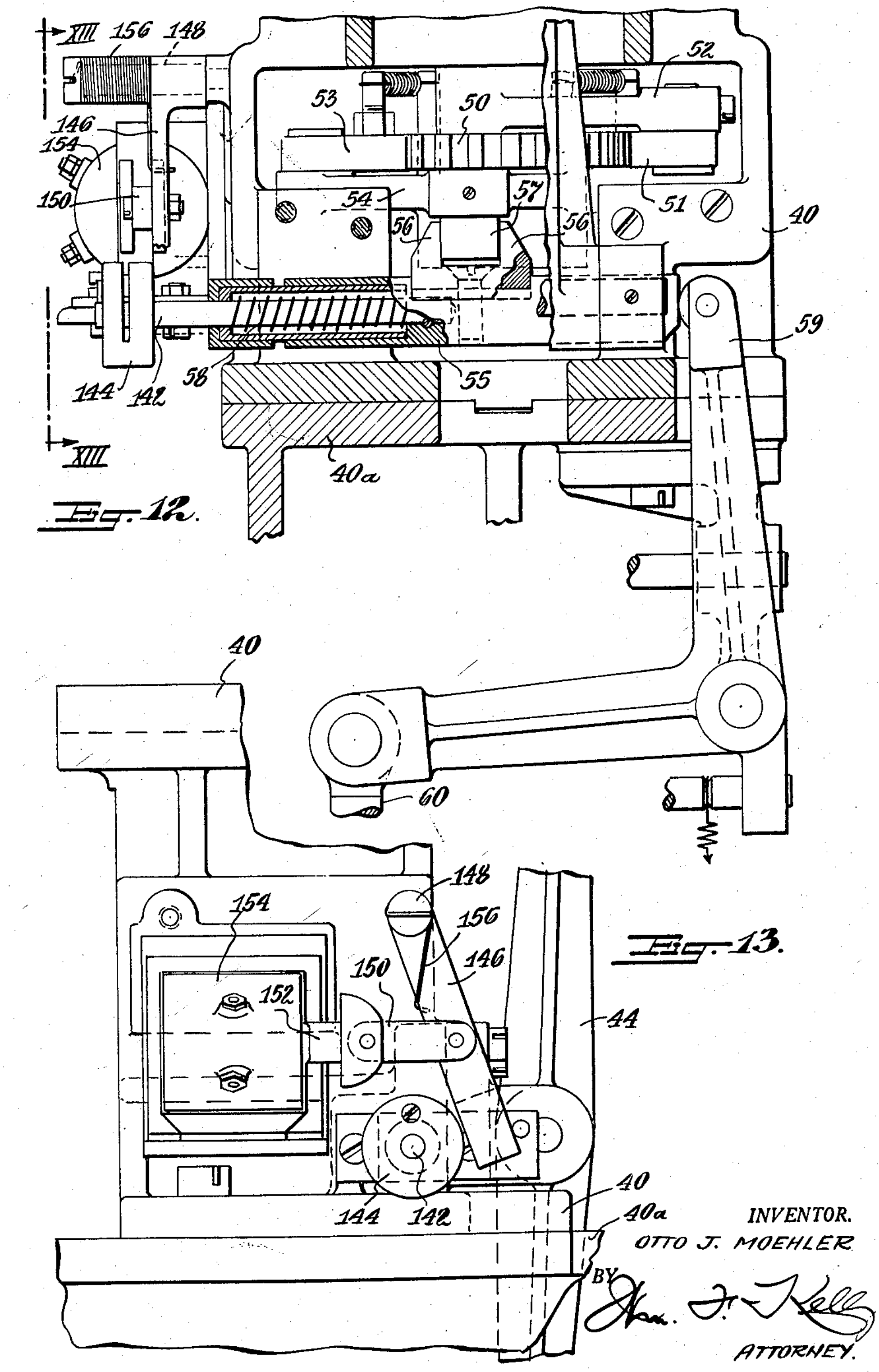
Fig. 12 is a vertical sectional view along the line XII—XII of Fig. 2.
Fig. 13 is a side elevational view of a stem detector as viewed from line XIII—XIII of Fig. 12.
Figure 14:
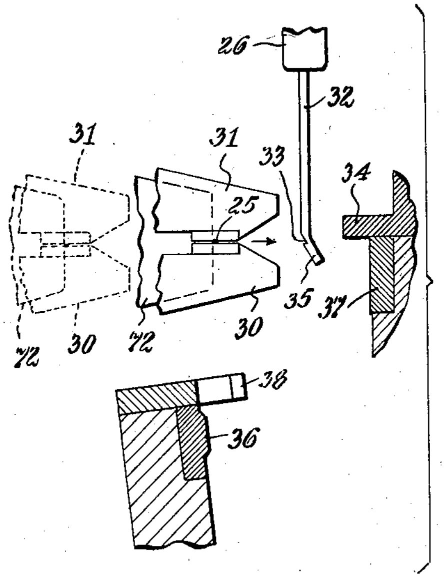
Figs. 14 to 20 are vertical sectional views showing successive steps of applying and securing the filament to the mount.

A stem detector is provided at station "42" of the general construction as shown particularly in Figs. 12 and 13. This detector (Figs. 3, 6, 7 and 12–13) in the event a head 28 does not carry a stem 26 into station "42" prevents the turret 29 from indexing and thus wasting a length of filament wire.

The slider 55 of the hereinbefore mentioned turret indexing mechanism carries a latch engaging shaft 142 (Figs. 12 and 13) which extends through and is suitably slidable in the frame casting 40. The shaft 142 carries a latch engaging collar 144 on the outer end thereof (Figs. 12 and 13). A spring loaded solenoid actuated latch 146 is pivoted on a pin 148 outstanding from the frame casting 40. The bottom portion of the latch 146 is engageable with the shaft 142 between the collar 144 and the frame casting 40 to prevent the sliding movement of the slider 55 and thus the rotation or indexing of the turret 29. The latch 146 is suitably connected near its mid-section by a link 150 to a generally horizontal operable operating plunger 152 of a normally energized latch operating solenoid 154 (Figs. 3, 6, 7, 12 and 13) suitably mounted to the side wall of the frame casting 40. A torsion release spring 156 (Fig. 12) has one end anchored on the pin 148 and the other end in engagement with the latch 146 to bias the latch toward its normally inoperative position.

This stem detector at station "42" comprises essentially a normally closed microswitch (not shown) having a roller carrying movable contact arm (not shown). The detector is carried by a bracket mounted on the frame 41 of the automatic filament mounting machine. Upon engagement at station "42" of the movable contact arm of such switch with a portion of the stem 26, for example, the exhaust tubulation thereof, the solenoid 154 in series with the switch and a suitable electrical supply (not shown) is deenergized upon opening of the normally closed switch. Hence, the spring 156 moves the latch 146 away from the slider shaft 142 and permits the slider 55 urged by the spring 58 to move to the right, when viewed in Fig. 12, and thus causes the turret 29 to index as hereinbefore explained.

*Alternative embodiment*

As an alternative embodiment (Figs. 22–26), I have found that I may dispense with the notches 33 in the lead wires 32, the brace 34 and the hammering action of the anvil 37 (Figs. 18–19) against the anvilling action of the hammer 36 to secure the filament wire in the lead wires 32. In this embodiment the brace 34 and anvil 37 are integral in the position shown in Fig. 19. Simultaneously, the hammer 36 and the anvil 37 move toward the positioned filament wire and lead wires 32 to embed said filament wire therein.

Figures 22, 23, 24, 25, 26:
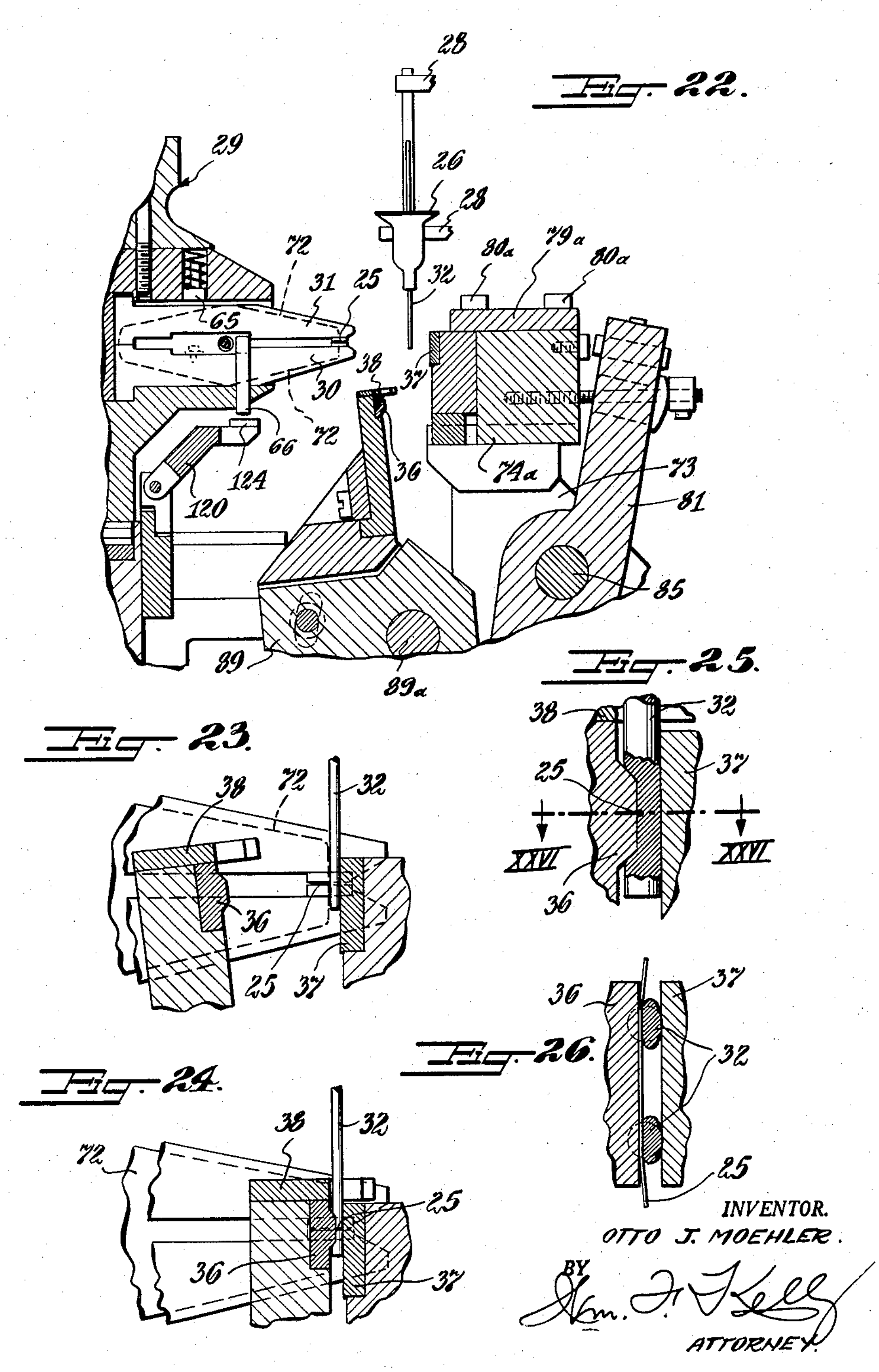
Fig. 22 is a view similar to Fig. 4 of an alternative embodiment of the device for feeding and mounting photoflash lamp filaments wherein the notching of the lead wires is omitted and showing the parts positioned at the beginning of the feeding and mounting operation.
Figs. 23 and 24 are vertical sectional views showing the successive steps of applying and securing the filament to the mount.
Fig. 25 is an enlarged fragmentary view of the hammer, filament, lead wire and anvil shown in Fig. 24.
Fig. 26 is a horizontal sectional view of the hammer filament, lead wires, and anvil along the line XXVI—XXVI of Fig. 25 in the direction of the arrows.

As shown in Fig. 22 the compound slide block 74 of Fig. 4 is replaced by a slide block **74*a*. The yieldable brace mounting 75 (Fig. 4) and its associated overlapping cap 76, spring loading 77, adjusting screw 78, the upward protrusion 79 of the slide block 74, and the adjustable stop 80, all employed in conjunction with the now eliminated brace 34 are no longer required in the alternative embodiment of Fig. 22. An overlapping cap 79*a* is secured by bolts 80*a* extending through the anvil carrying forward portions of the slide block 74*a* and the rear of the slide block 74*a***.

Fig. 22 shows the position of the stem 26 after the head 28 has indexed into the filament feeding station (station "43"), in front of the filamnet mounting device. The filament wire gripping jaws 30—31 on the turret 29 then move laterally from the position shown in Fig. 22 to the filament loading position shown in Fig. 23. The hammer 36 starts to move upwardly and the anvil 37 starts to move laterally toward the lead wires 32. Fig. 23 shows the hammer 36 in its uppermost vertical position, ready to rotate inwardly toward lead wires 32 and the anvil 37 in its innermost position against the lead wires 32. The wire locating blades 72 carried by the jaws 30—31 may again but not necessarily carry the outer ends of the filament wire beyond the vertical plane of the lead wires 32 to force the filament 25 against the lead wires 32. The hammer 36 and the lead wire retainer 38 rotate inwardly from the position shown in Fig. 23 toward the filament 25 held against the lead wires 32. The retainer 38 engages the lead wires 32, before the hammer 36 engages the lead wires 32 to guarantee a uniform length of the filament 25. With the anvil 37 remaining stationary the hammer 36 drives the filament 25 into the lead wires 32 to solidly embed the filament 25 in said lead wires 32 and provide a good electrical contact therebetween, as shown in Figs. 24, 25 and 26. The ends of the filament 25 are cut by the cutter 39, as shown in Figs. 2, 3 and 17, thus completing the mount. The hammer 36 and the anvil 37 retract to the position shown in Fig. 22, and the head 28 carrying the completed mount indexes to the next station.

Although a preferred embodiment of the invention has been disclosed, it will be understood that modification may be made within the spirit and scope of the invention.

I claim:

1. A filament mounting device for mounting a taut filament wire on a pair of lead wires of a stem supported on a stem holding head on an adjacent conveyor, comprising mounting means; a turret on said mounting means adjacent the path of movement of said head, means for rotating said turret on said mounting means and transitionally moving said turret on said mounting means transverse to said pair of lead wires; filament wire gripping means on said turret for receiving said filament wire and for holding said filament wire taut while it is presented for attachment to said lead wires during the transitional movement of said turret, said gripping means being further operable to release said filament wire after attachment thereof to said lead wires; an anvil on said mounting means, means for transitionally moving said anvil on said mounting means transverse to said lead wires to cause the anvil to engage and brace said lead wires during the attachment of said filament wire thereto; a hammer on said mounting means; and means for moving said hammer on said mounting means transverse to said lead wires to cause the hammer to impact said taut filament wire against the braced lead wires, thereby solidly embedding it in said braced lead wires.

2. A filament mounting device for mounting a taut filament wire on a pair of lead wires of a stem supported on a stem holding head on an adjacent conveyor, each having a notch therein and the terminal end thereof angularly disposed with respect to the longitudinal axis thereof, comprising mounting means; a turret on said mounting means adjacent the path of movement of said head, means for rotating said turret on said mounting means and transitionally moving said turret on said mounting means transverse to said pair of lead wires; filament wire gripping means on said turret for receiving said filament wire and operable to hold said filament wire taut while it is presented for insertion in the notches in said lead wires during the transitional movement of said turret, said gripping means being further operable to release said filament wire after attachment thereof to said lead wires; a brace on said mounting means, means for moving said brace on said mounting means transverse to said lead wires to cause said brace to engage and brace said lead wires during the attachment of said filament wire thereto; a hammer on said mounting means, operating means for moving said hammer on said mounting means transverse to said lead wires to clamp said braced lead wires against said brace; an anvil on said mounting means, and means for moving said anvil on said mounting means transverse to said clamped lead wires to move the terminal end of said lead wires into alignment with the longitudinal axis thereof thereby locking said filament wire in said lead wires, said operating means being further operable to cause further movement of said hammer on said mounting means transverse to said clamped lead wires and locked filament wire to impact said lead wires against the anvil, thereby solidly embedding the locked filament wire in said clamped lead wires.

3. A filament mounting device for mounting a taut filament wire on a pair of lead wires of a stem supported on a stem holding head on an adjacent conveyor, each having a notch therein and the terminal end thereof angularly disposed with respect to the longitudinal axis thereof, comprising mounting means; a turret on said mounting means adjacent the path of movement of said head, means for rotating said turret on said mounting means and transitionally moving such turret on said mounting means transverse to said pair of lead wires; filament wire gripping means on said turret for receiving said filament wire and for holding said filament wire taut while it is presented for insertion in the notches in said lead wires during the transitional movement of said turret means, said gripping means being further operable to release said filament wire after attachment thereof to said lead wires; a brace on said mounting means, means for transitionally moving said brace on said mounting means transverse to said lead wires to cause said brace to engage and brace said lead wires during the attachment of said filament wire thereto; a hammer on said mounting means, operating means for moving said hammer on said mounting means transverse to said lead wires to clamp said braced lead wires against said brace; an anvil on said mounting means, means for moving said anvil on said mounting means transverse to said clamped lead wires to move the terminal end of said lead wires into alignment with the longitudinal axis thereof thereby locking said filament wire in said lead wires, said operating means being further operable to cause the further movement of said hammer on said mounting means transverse to said clamped lead wires and locked filament wire to impact said lead wires against said anvil thereby solidly embedding the locked filament wire in said clamped lead wires; and retaining means on said hammer for preventing lateral displacement of said lead wires toward and away from each other during the mounting of said filament wire, thereby determining the length of the mounted filament wire.

4. A filament mounting device for mounting a taut filament wire on a pair of lead wires of a stem supported on a stem holding head on an adjacent conveyor, each having a notch therein and the terminal end thereof angularly disposed with respect to the longitudinal axis thereof, comprising mounting means; a turret on said mounting means adjacent the path of movement of said head, means for rotating said turret on said mounting means and transitionally moving such turret on said mounting means transverse to said pair of lead wires; filament wire gripping means on said turret for receiving said filament wire and for holding said filament wire taut when presented for insertion in the notches in said lead wires during the transitional movement of said turret means, said gripping means being further operable to release said filament wire after attachment thereof to said lead wires; a brace on said mounting means, means for moving said brace on said mounting means transverse to said lead wires to cause said brace and to engage and brace said lead wires during the attachment of said filament wire thereto; a hammer on said mounting means, operating means for moving said hammer on said mounting means transverse to said lead wires to clamp said braced lead wires against said brace; an anvil on said mounting means, means for moving said anvil on said mounting means transverse to said clamped lead wires to move the terminal end of said lead wires into alignment with the longitudinal axis thereof thereby locking said filament wire in said lead wires, said operating means being further operable to cause further movement of said hammer on said mounting means transverse to said clamped lead wires and locked filament wire to impact said lead wires against said anvil, thereby solidly embedding the locked filament wire in said clamped lead wires; and locating means on said gripping means for locating the taut filament wire in said notches.

5. A filament mounting device for mounting a taut filament wire on a pair of lead wires of a stem supported on a stem holding head on an adjacent conveyor, each having a notch therein and the terminal end thereof angularly disposed with respect to the longitudinal axis thereof, comprising mounting means; a turret on said mounting means adjacent the path of movement of said head, means for rotating said turret on said mounting means and transitionally moving said turret on said mounting means transverse to said pair of lead wires; filament wire gripping means on said turret for receiving said filament wire and for holding said filament wire taut while it is presented for insertion in the notches in said lead wires during the transitional movement of said turret, said gripping means being further operable to release said filament wire after attachment thereof to said lead wires; a brace on said mounting means, means for moving said brace on said mounting means transverse to said lead wires to cause said brace to engage and brace said lead wires during the attachment of said filament wire thereto; a hammer on said mounting means, operating means for moving said hammer on said mounting means transverse to said lead wires to clamp said braced lead wires against said brace; an anvil on said mounting means, means for moving said anvil on said mounting means transverse to said clamped lead wires to move the terminal end of said lead wires into alignment with the longitudinal axis thereof thereby locking said filament wire in said lead wires, said operating means being further operable to cause further movement of said hammer on said mounting means transverse to said clamped lead wires and locked filament wire to impact said lead wires against said anvil, thereby solidly embedding the locked filament wire in said clamped lead wires; and cutting means on said mounting means and operable to sever said embedded filament wire.

6. A filament mounting device for mounting a taut filament wire on a pair of lead wires of a stem supported on a stem holding head on an adjacent conveyor, each having a notch therein and the terminal end thereof angularly disposed with respect to the longitudinal axis thereof, comprising mounting means; a turret on said mounting means adjacent the path of movement of said head, means for rotating said turret on said mounting means and transitionally moving such turret on said mounting means transverse to said pair of lead wires; filament wire gripping means on said turret for receiving said filament wire and for holding said filament wire taut while it is presented for insertion in the notches in said lead wires during the transitional movement of said turret means, said gripping means being further operable to release said filament wire after attachment thereof to said lead wires; a brace on said mounting means, means for moving said brace on said mounting means transverse to said lead wires to cause said brace to engage and brace said lead wires during the attachment of said filament wire thereto; a hammer on said mounting means, operating means for moving said hammer on said mounting means transverse to said lead wires to clamp said braced lead wires against said brace; an anvil on said mounting means, means for moving said anvil on said mounting means transverse to said clamped lead wires to move the terminal end of said lead wires into alignment with the longitudinal axis thereof thereby locking said filament wire in said lead wires, said operating means being further operable to cause further movement of said hammer on said mounting means transverse to said clamped lead wires and locked filament wire to impact said lead wires against the anvil thereby solidly embedding the locked filament wire in said clamped lead wires; retaining means on said hammer means for preventing lateral displacement of said lead wires toward and away from each other during the mounting of said filament wire thereby determining the length of the mounted filament wire; locating means on said gripping means for locating the taut filament wire in said notches; and cutting means on said mounting means and operable to sever said embedded filament wire.

References Cited in the file of this patent

UNITED STATES PATENTS

| | | |
|---|---|---|
| 1,801,119 | Soepnel | Apr. 14, 1931 |
| 1,816,683 | Ledig | July 28, 1931 |
| 2,085,578 | Flaws | June 29, 1937 |
| 2,327,033 | Flaws | Aug. 17, 1943 |
| 2,380,742 | Flaws | July 31, 1945 |
| 2,640,509 | Kulberg | June 2, 1953 |
| 2,667,189 | Flaws | Jan. 26, 1954 |